United States Patent [19]

Weisenbarger et al.

[11] Patent Number: 4,761,228
[45] Date of Patent: Aug. 2, 1988

[54] MAGNETIC FLUID CONDITIONER

[76] Inventors: Gale M. Weisenbarger, 140 Woodland Dr., Eaton, Ohio 45320; John C. Moran, 3124 Lake Ave., Fort Wayne, Ind. 46805

[21] Appl. No.: 15,520

[22] Filed: Feb. 13, 1987

Related U.S. Application Data

[63] Continuation of Ser. No. 756,954, Jul. 19, 1985, abandoned, which is a continuation-in-part of Ser. No. 618,816, Jun. 8, 1984, Pat. No. 4,543,186.

[51] Int. Cl.⁴ .............................................. C02F 1/48
[52] U.S. Cl. ...................................... 210/222; 55/100
[58] Field of Search .................... 210/222, 223; 55/100

[56] References Cited

U.S. PATENT DOCUMENTS

| D. 277,775 | 2/1985 | Moran et al. ........................... D23/3 |
| D. 279,027 | 5/1985 | Weisenbarger et al. ............... D23/3 |
| 2,268,128 | 12/1941 | Reeves .................................. 210/222 |
| 4,157,963 | 6/1979 | Jessop et al. ........................ 210/222 |
| 4,210,535 | 1/1980 | Risk ..................................... 210/222 |
| 4,229,389 | 10/1980 | Granger ............................... 210/223 |
| 4,367,143 | 1/1983 | Carpenter ............................ 210/222 |
| 4,372,852 | 2/1983 | Kovacs ................................ 210/222 |
| 4,568,901 | 2/1986 | Adam ................................... 210/222 |
| 4,572,145 | 2/1986 | Mitchell et al. ..................... 210/222 |
| 4,605,498 | 8/1986 | Kulish ................................. 210/222 |
| 4,711,271 | 12/1987 | Weisenbarger et al. ............. 210/222 |

Primary Examiner—Richard V. Fisher
Assistant Examiner—W. Gary Jones
Attorney, Agent, or Firm—Louis E. Hay

[57] ABSTRACT

A magnetic unit for polarizing particles in fluid being conducted in a fluid conducting conduit, the objective being to prevent particulate matter from adhering to the inner wall of the fluid conducting conduit. The magnetic unit includes at least two magnets potted in a housing and surrounding a tube to be incorporated into the conduit thereby providing treatment of the fluid being conducted through the conduit.

2 Claims, 3 Drawing Sheets

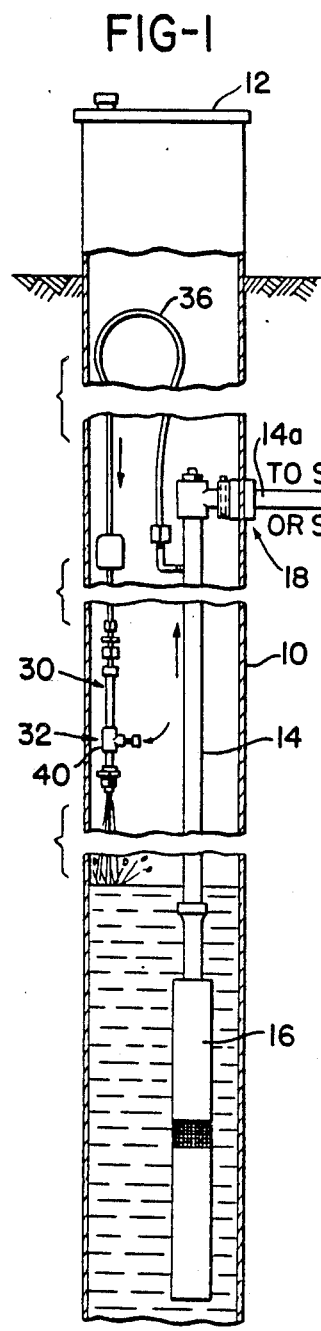
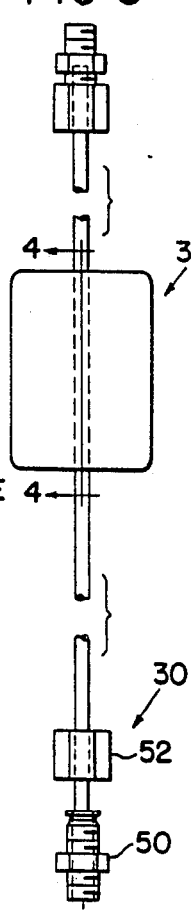
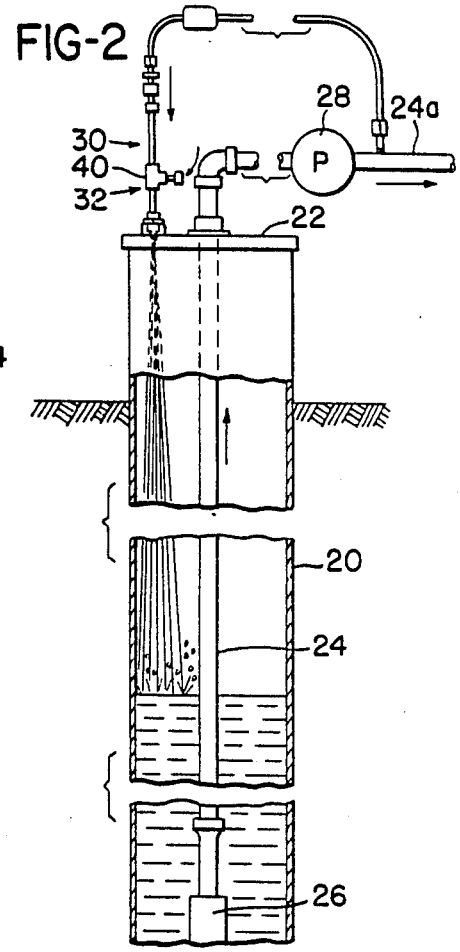
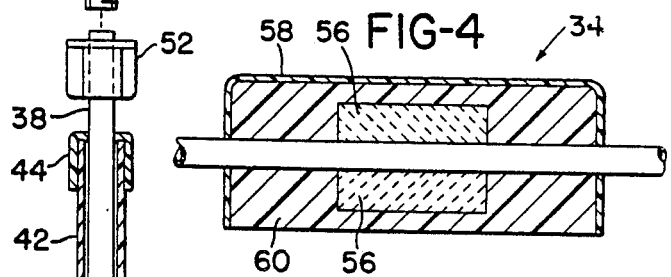
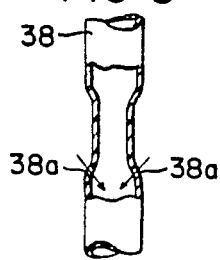
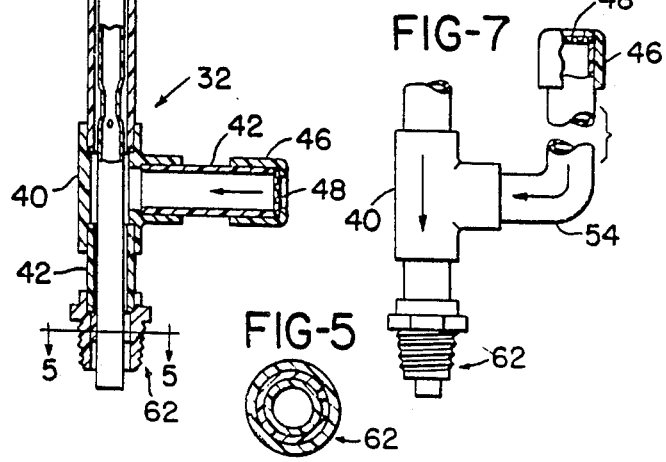

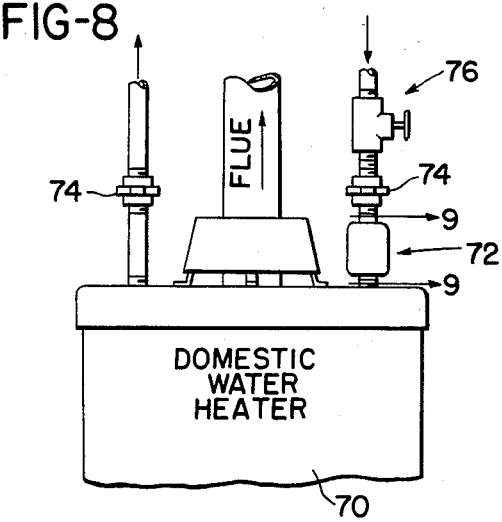
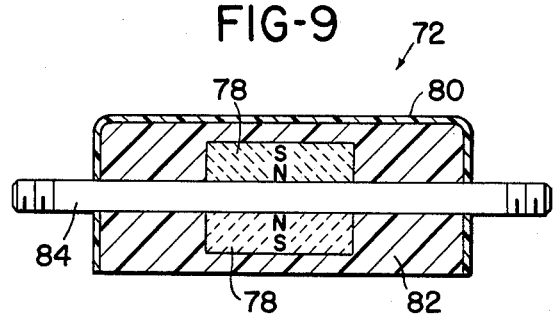
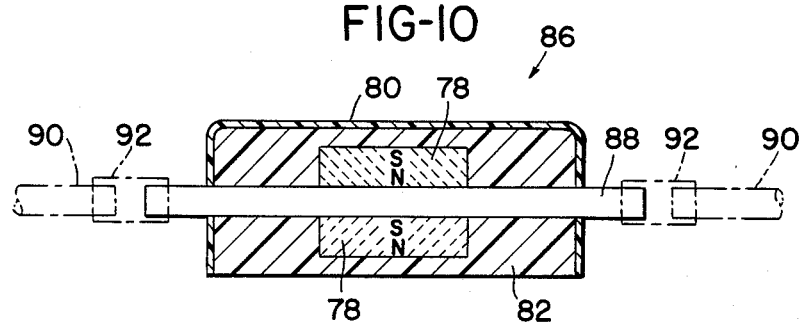
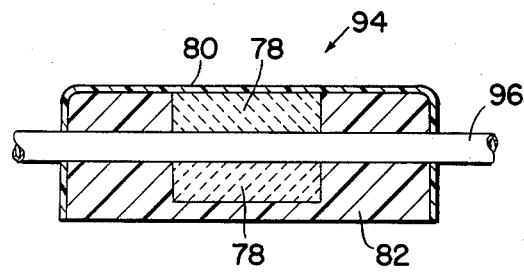

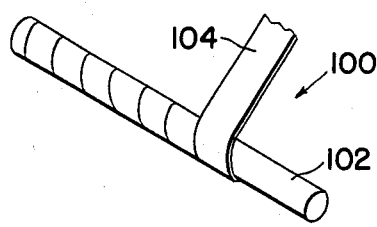
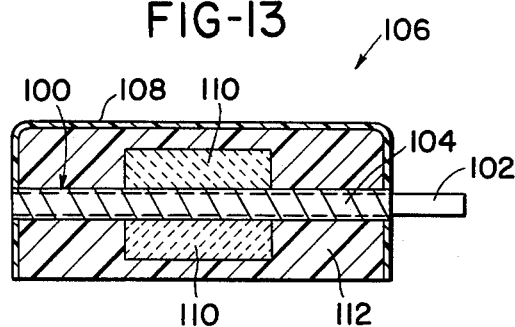
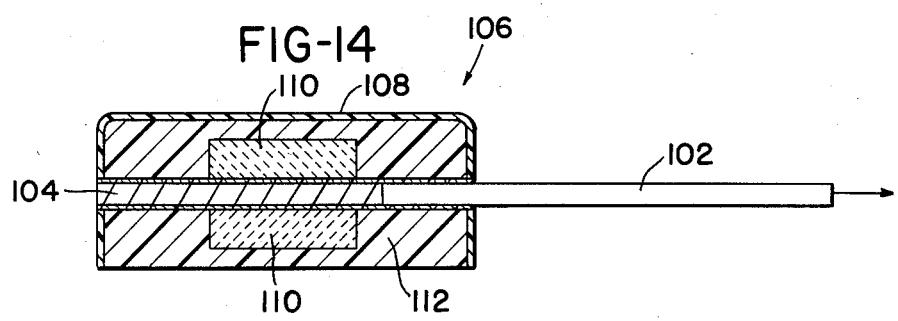
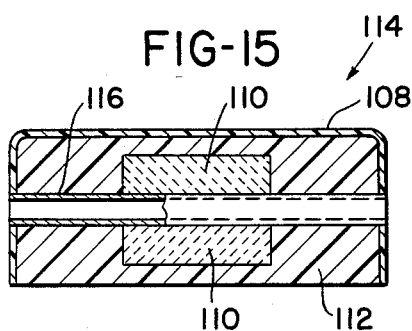
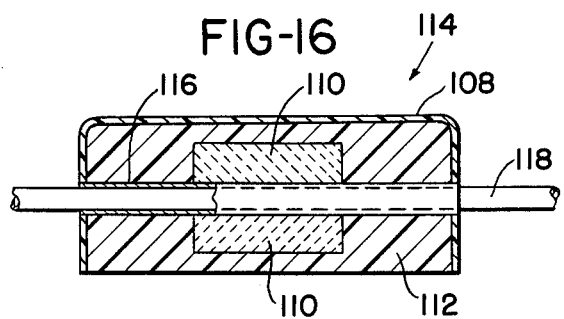

MAGNETIC FLUID CONDITIONER

REFERENCE TO PARENT APPLICATION

This is a continuation application of co-pending application Ser. No. 756,954 Weisenbarger et al, filed July 19, 1985 now abandoned, which is a continuation-in-part application of co-pending parent application Ser. No. 618,816 Apparatus And Method For The Treatment Of Well Water Therewith, filed June 8, 1984 and now U.S. Pat. No. 4,543,186, issued Sept. 24, 1985.

REFERENCE TO RELATED U.S. PATENT APPLICATION

Ser. No. 600,845 filed Apr. 16, 1984, Magnetic Device and Method For Abating the Adherence of Precipitates in Fluid Transmitting Conduits Therewith—John C. Moran et al.

BACKGROUND OF THE INVENTION

All subterranean water contains mineral and other chemical substances and compounds which are soluble in the water. Most, if not all, of these substances are introduced in the water, which started as rain or snow, as the water flows in natural underground channels.

The problem with water which flows from, or which is pumped from wells in the ground, is to remove the undesirable elements which are in solution. While the undesirable compounds are in solution, they cannot be reduced or removed by a filtration process. There are only two methods by which the undesirable compounds may be removed. The most common method, especially in large water systems such as municipal water systems, is by chemical treatment in combination with filtration. A second method, of which U.S. Pat. No. 3,649,532 Method of Treating Water—McLean, is an example, is by a combination of aeration and filtration. The object of the latter method is to convert the undesirable compounds which are in unfilterable solution into either precipitates or colloids which may be removed by subsequent filtration.

For purpose of illustration only, two of the more common objectionable soluble compounds in well water are compounds containing sulphur and iron. Although the presence of such compounds may not be visible in the water, the sulphur compounds produce a most objectionable odor and taste, and the iron compounds produce the severe discoloration which is often observed on fixtures such as sinks, bath tubs, and the water tanks on toilets.

Ferrous carbonate, $FeCO_3$, is soluble in carbon dioxide and forms ferrous hydrogen carbonate, $Fe(HCO_3)_2$, which is contained in many ground waters. On contact with air, carbon dioxide is lost and oxidation takes place, precipitating the iron as hydrated ferric oxide. In addition to staining fixtures, the hydrated ferric oxide will also form scale in pipes, and will provide a suitable environment for the growth of Crenothrix and other iron-oxidizing bacteria. The purification of such iron bearing water may be effected by suitable aeration and filtration.

One apparatus and method for the aeration and filtration of well water is disclosed in the referenced U.S. Pat. No. 3,649,532. The necessary equipment is not unreasonable for large commercial installations where it will be serviced on a regular basis by qualified operating personnel; however, it is too cumbersome and expensive for individual home use such as the household of a farmer, or a suburban family which is not on a public water system in which the water is treated at a central station.

SUMMARY OF THE INVENTION

The present invention provides a simple apparatus and method for the treatment of well water on an individual basis, regardless of the size of the well. The apparatus and method employed by the teachings of U.S. Pat. No. 3,649,532 requires a specially constructed storage tank which is substantially larger and much more expensive than a comparable conventional tank, and also requires substantial additional plumbing and regular periodic servicing. U.S. Pat. No. 3,649,532 provides teachings of an aeration system which operates intermittently, and which has no effect on the water in the well.

An installation using the apparatus and method of the present invention uses a conventional storage tank and also conventional plumbing. Whereas in U.S. Pat. No. 3,649,532 the aeration takes place in the special storage tank and affects only the water in the tank, the apparatus of the present invention is installed in the well casing itself, and is a continuously acting process which has a beneficial effect on the water in the well before the water is pumped from the well.

The apparatus and method, constituting the present invention, continuously draws a small quantity of water from the high pressure side of the system, polarizes the water with a magnetic unit, and then aerates this by-pass water and returns the aerated by-pass water to the surface of the water in the well. The principal advantage of this treatment method is that, over a period of time, the composition of the water in the well is beneficially altered, which in turn has a beneficial effect on the pumps, pipes, and other components comprising the water system.

The aforementioned treatment creates a colloidal suspension of the hydrated ferric oxide and hardness salts. When the water also contains oxygen absorbed during the aeration process, and is returned to the well, the colloidal particles act as seed crystals bringing about the oxydation and precipitation of the dissolved iron throughout the body of water in the well casing and gradually spreads into the aquifer. A graphic analogy to the spread of the precipitation can be seen in the diffusion of a drop of food coloring dropped into a jar of water. After the precipitation has occured, the precipitates may be filtered from the water prior to consumption.

The treatment of the present invention is not limited to soluble compounds containing iron, but is also effective for the removal of hydrogen sulfide, soluble compounds containing manganese, and other compounds in the water. The effectiveness of the apparatus is enhanced by surrounding a portion of the tube carrying the feedback of by-pass water to the aerator assembly with a magnetic polarization unit which will be described below.

BRIEF DESCRIPTION OF THE DRAWINGS

FIG. 1 is a schematic illustration of the apparatus, constituting the invention, installed in a well using a submersible pump;

FIG. 2 is a schematic illustration of the apparatus, constituting the invention, installed in a well using an external pump;

FIG. 3 is an enlarged schematic illustration, partially in cross-section, and depicting the principal components of the apparatus;

FIG. 4 is a cross-section taken on line 4—4 of FIG. 3 and depicting one form of the magnetic polarization unit;

FIG. 5 is a cross-section taken on line 5—5 of FIG. 3;

FIG. 6 is an enlarged detail of one form of a venturi tube;

FIG. 7 is an illustration of an alternate screened air inlet for use within a well casing;

FIG. 8 is an illustration depicting a magnetic polarization unit installed in the cold water inlet pipe of a conventional domestic water heater;

FIG. 9 is a cross-section of a magnetic polarization unit, such as depicted in FIG. 8, rotated to a horizontal attitude and encompassing a conventional pipe nipple made of a magnetic material;

FIG. 10 is a cross-section comparable to FIG. 9 in which the tube or pipe is made of a non-magnetic material;

FIG. 11 is a cross-section comparable to FIGS. 9 and 10, in which one of the magnets abuts the housing;

FIG. 12 is a perspective illustration depicting the wrapping of a mandrel used in forming the magnetic polarization unit depicted in FIGS. 13 and 14;

FIG. 13 is a vertical cross-section depicting the wrapped mandrel in position while the magnets are being potted in the housing;

FIG. 14 is a vertical cross-section, comparable to FIG. 13, depicting withdrawal of the mandrel;

FIG. 15 is a vertical cross-section, comparable to FIGS. 9 and 10, in which a sleeve is used; and, FIG. 16 is a vertical cross-section, comparable to FIG. 15, in which a length of conduit is being passed through the sleeve in the magnetic polarization unit.

DESCRIPTION OF THE PREFERRED EMBODIMENT

The manner of constructing wells and pumping water therefrom involves many variables, for which reason there is no standard installation. For example, a shallow well can use a suction pump as illustrated in FIG. 2; however, a deep well will require a submersible pump as illustrated in FIG. 1. Also, in a warmer climate where ambient conditions permit, the water from the well may be carried in exposed pipes, whereas in colder climates the pipes must be buried below the freeze line. There are also additional variables, as for example, some installations will use iron pipe with threaded joints as water transmitting conduits, while other installations will use copper tubing with soldered joints. Some codes also permit the use of plastic pipes. Because of the many possible variables, the well installations depicted in FIGS. 1 and 2 are to be regarded merely as being representative of the many possible installations as practiced in the well art.

Specific reference is made to FIG. 1 which illustrates a deep well installation having a casing 10, the lower end of which extends into the well water, and with the upper end extending above ground level where it is provided with a cover 12. The lower end of pipe 14 has attached thereto a conventional submersible pump 16 which is suspended into the water and which, when electrically energized, pumps water into pipe 14. It is normal to provide the casing with a pitless adapter 18 which is mounted through an aperture in the casing. Pitless adapters are well known in the art, and, since they have a vertically sliding connection inside the casing, they provide a convenient connection which permits the pump to be pulled from the well for servicing or repair when necessary. A pipe 14a screws into the pitless adapter from the outside and carries the water to a storage tank of conventional design as used in water systems. Pressure switches, electrical wiring, gauges and other additional components necessary to operate the water system are well known in the art, for which reason they require no further description.

Reference is now made to FIG. 2 which illustrates a typical shallow well installation having a casing 20, the lower end of which extends into the well water, and with the upper end extending above ground level where it is provided with a cover 22. The lower end of pipe 24 has attached thereto a conventional screen filter 26. The pipe 24 extends through the cover 12 and is attached to the inlet side of a pump 28 which pumps water from the well and transmits it to a conventional storage tank through a high pressure pipe 24a. As in FIG. 1, all ancillary equipment, which is well known, has been omitted from FIG. 2.

Reduced to its basic components, the apparatus constituting the present invention consists of a feedback means for by-passing or returning a portion of the water from the high pressure side of the water system to the well, with means for magnetically acting on, or polarizing the by-pass water, and also with means for aerating the by-pass water before returning it to the unpumped water in the well.

Whereas the method of treating water in the U.S. Pat. No. 3,649,532 acts only intermittently on the water being pumped from a well into the storage tank, applicants' apparatus and treatment method is to continuously treat a small portion of the pumped water and return it to the well. Applicants' method of treatment will, over a period of time, improve the character of the raw water in the well and in the aquifer.

Whereas in the treatment method employed in U.S. Pat. No. 3,649,532 there is no improvement in the quality of the raw water in the well, and the treatment is applied only to the water pumped from the well, the applicants' treatment method is applied to the water being by-passed from the high pressure side of the water system, the principal objective being to improve the raw well water itself, which will in turn decrease the frequency for replacing or servicing the filters used in the water system and also prolong the service life of the pump, valves and pipes of the system.

Applicants' apparatus will vary in the specific pipe and/or tubing fittings used, as dictated by the particular well installation; however, all fittings are readily available at plumbing supply and most hardware retailers. Applicants' preference is to use plastic fittings because such fittings will not corrode in an environment containing corrosive compounds such as are contained in much raw water and in the ambient environment within the well casing above the water level.

FIG. 1 depicts an installation in which the apparatus of the present invention is within the well casing, and FIG. 2 depicts an installation in which the apparatus is mounted externally. FIG. 3 is an enlarged exploded depiction of one combination of elements forming the apparatus of the present invention.

As its principal elements, the apparatus 30 has an aerator assembly 32, a magnetic unit 34, and a by-pass tube 36 which passes through the magnetic unit and connects the aerator assembly to the high pressure side of the water system.

The aerator assembly 32 contains a venturi tube 38 which may be made, for example, from a length of Lexan plastic tubing. The venturi portion itself may be formed by elevating the temperature of a small length of the tube a sufficient amount to permit it to elongate with a reduction in diameter at the heated portion when the tube is stretched. FIG. 6, which is an enlarged portion of the tube, illustrates the venturi in the cross-sectional portion of the tube. After the venturi is formed, a plurality of small apertures 38a are formed in the general downstream area indicated by the arrows in FIG. 6.

Within the scope of the invention, other materials and methods may be used for forming the venturi tube. For example, the tube may be formed of copper or aluminum with the reduced diameter of the venturi formed by the rolling process. The applicants' preference for the depicted application on a water system is to form the venturi from a rigid plastic tubing of ⅜ inch (9.53 mm) outside diameter by the above-described method of forming the venturi section; standard CPVS rigid plastic pipe and fittings of ½ inch (12.70 mm) inside diameter, such as used on plumbing installations, for the housing of the aerator assembly; and flexible ¼ inch (6.35 mm) outside diameter tubing for the by-pass tube.

The principal requirements for the aerator assembly housing are that the housing supports the venturi tube; that the housing have a cavity surrounding the venturi section and portions of the adjacent upstream and downstream portions of the tube; and, with the open ends of the tube extending from the housing.

The aerator assembly housing may be formed of a standard tee 40, to which suitable lengths of pipe 42 are affixed by any one of serveral adhesives sold at all plumbing supply and hardware stores for such purpose. The open end of the upstream pipe of tube 42 is closed by means of a standard cap 44 having an aperture formed in the end thereof for passage of the venturi tube 38 as illustrated in FIG. 3. Another standard cap 46, having an aperture formed in the end thereof, retains a wire mesh screen 48 as depicted in FIG. 3. The upper end of the venturi tube 38 and the lower end of the by-pass tube 36 may be joined in any convenient manner. Applicants found the most convenient method was to use standard compression fittings having a central portion 50 with male threads on each end and compression nuts 52. The venturi tube should be longitudinally retained in desired position with a sealant which will also prevent passage of air between the tube and cap 44. The fittings at the lower end of the venturi tube 38 and the upper end of the by-pass tube 36 will be dependent on the particular installation, for which reason they are not further described. A variation of the aerator assembly is depicted in FIG. 7 in which a horizontal tube 42 in FIG. 3 is replaced with a 90 degree elbow 54.

Within the scope of the present invention, as described and claimed, the word "tube" is used in the generic dictionary sense as being a hollow cylinder to convey liquids and gases. By using the tubing sizes stated above, it is noted that there is a cavity within the housing which surrounds the venturi section of the venturi tube, and that there is an open lateral passage in communication with the cavity surrounding the venturi tube.

As depicted at the bottom of FIG. 3, a compression fitting 62, having a male pipe thread useful for installation in the cover 12 of FIG. 2, is used to retain the lower end of the venturi tube in leak-proof relationship with the inside of adjacent tube 42.

During operation, as the water flowing in the by-pass tube 36 has its pressure reduced when flowing through the throat of the venturi tube 38, ambient air is aspirated through the screen 48 and passes through the apertures 38a and aerates the water. The scientific reasons why a venturi operates are well known in the mechanical and hydraulic arts, for which reason no further explanation is required.

In the referenced patent application Ser. No. 600,845 a single elongated permanent bar magnet is potted in a dielectric housing, and the magnetic units, so formed, are used in pairs by externally mounting them on a fluid transmitting conduit. In the magnetic unit of the present invention, two elongated bar magnets are potted in a single dielectric housing with the by-pass tube 36 passing through the housing and being longitudinally positioned to be between and parallel with the two magnets.

Specific reference is now made to FIG. 4 which is an enlarged cross-section of the novel magnetic unit 34. The two elongated permanent magnets are potted in an elongated dielectric housing 58 by means of conventional petroleum base potting material 60 which is well known to the art. The by-pass tube 36 extends through the magnetic unit in substantially the position depicted in FIGS. 3 and 4. If the tube is passed through the necessary apertures in the housing before the potting material is poured, the potting material will bond onto the tube and prevent the magnetic unit from moving on the tube.

A magnetic unit in accordance with the present invention may be used for other applications where it is desired to produce a polarizing effect on particles in a fluid. For example, the magnetic units may be made with threaded pipe nipples or short lengths of copper tubing for installation on water heaters and evaporative coolers. This would produce a permanent installation of the magnetic unit as opposed to strapping two magnetic units to the outside of a conduit in accordance with the referenced patent application.

Within the scope of the invention, a shut-off valve may be added between the inlet end of the by-pass tube and the high pressure side of the water system to control the rate of flow in the by-pass tube, and to inactivate the by-pass apparatus for servicing without inactivating the entire water system.

Specific reference is now made to FIG. 8 which depicts a magnetic polarizing unit installed on a conventional domestic water heater 70. The magnetic polarizing unit 72, which is functionally identical to the magnetic unit 34 depicted in FIGS. 3 and 4, is installed in the inlet or cold water supply pipe to the water heater 70. The fluid or water connections to and from the water heater, as depicted, are standard iron pipe having standard unions 74 for ease of connection, and with the inlet or cold water supply pipe having a standard shut-off valve 76.

Whereas the magnetic units depicted in the patent application Ser. No. 600,845 are specifically designed for external attachment to and detachment from existing fluid transmitting conduits, the magnetic units of the present application are for permanent installation in fluid transmitting conduits. Although the two types of magnetic units are for the same functional purpose, they are not interchangeable. Also, whereas the magnetic units of application Ser. No. 600,845 are used in pairs, only a single unit, as taught in the present application, is required for a specific installation.

FIG. 9 is a cross-section through the magnetic unit 72 used on the heater installation shown in FIG. 8. The magnetic unit has two elongated permanent bar magnets 78 which are potted in an elongated dielectric housing 80 by means of conventional petroleum base potting material 82. A length of iron pipe, such as a conventional pipe nipple 84 having threaded ends which extend from both ends of the dielectric housing 80, passes through the housing. As depicted, the pipe passes between the two magnets which abut the pipe and are positioned to have the N-pole on each magnet directly adjacent to the pipe.

Experience has shown that, when a conduit made of a magnetic material is passed through the magnetic unit, the magnets should be positioned with like poles, preferably the N-poles, to be adjacent to the conduit, as depicted in FIG. 9.

FIG. 10 depicts a magnetic unit 86 in which the several elements are identical with the elements of FIG. 9 with the exception that the conduit 84 of magnetic material has been replaced by a conduit 88 of non-magnetic material, such as ordinary copper tubing. As depicted, the magnetic unit is installed in series into the conduit system 90 by conventional tube couplings 92; the system 90 and couplings 92 being depicted in phantom lines. When a conduit, such as conduit 88 is of a non-metallic material, the two magnets should be positioned to have unlike poles abutting the conduit. Again, the flux lines from the two magnets react in the usual manner, and will polarize the fluid flowing through the conduit without effect on the conduit itself.

The non-magnetic conduit 88 is not limited to copper tubing, which was used for purposes of illustration only. Other examples of non-magnetic conduits would include aluminum tubing and plastic tubing which is not impregnated with magnetic particles.

Whereas FIGS. 9 and 10 depict two magnets completely surrounded by the potting material(except for the small portions abutting the conduit), FIG. 11 depicts one of the magnets abutting a portion of the housing. The several elements of magnetic unit 94 are identical with the elements of FIGS. 9 and 10 as indicated by like numerals. If the conduit 96 is of magnetic material, the poles of the magnets should be arranged as depicted in FIG. 9. If the conduit 96 is of non-magnetic material, the poles of the magnets should be arranged as depicted in FIG. 10.

Although the use of the magnetic units has been depicted and described in connection with the treatment of well water and on water heaters; within the scope of the invention there are many other applications. In both examples the fluid was water; however, the magnetic units will have a beneficial polarizing effect on many other fluids, such as are used in the chemical and petroleum industries.

Specific reference is now made to FIGS. 13 and 14 which depict a magnetic unit having a sized passage therethrough for receiving a fluid transmitting conduit. The passage may be formed by a mandrel at the time the magnets are potted in the dielectric housing.

FIG. 12 depicts one type of mandrel for forming the required passage through the magnetic unit. Magnetic units of this type must have a passage for receiving a specific diameter of pipe or tubing, as for example, ⅜ inch (9.53 mm) outside diameter tubing. The passage must freely receive the tubing without being larger than necessary. One type of suitable mandrel 100 may be an oversized wooden dowel or core element 102 which is wrapped with thin non-adhesive plastic tape 104. The plastic tape prevents the potting material from bonding to the core element 102 which must be withdrawn after the potting material becomes set. The core element 102 may be of other convenient materials such as a plastic or matallic rod, or it may be of a length of tubing.

The magnetic unit 106, depicted in FIGS. 13 and 14, has an elongated dielectric housing 108 having longitudinally aligned apertures in the ends thereof, and two permanent bar magnets 110, as were previously described.

FIG. 13 depicts the relationship between the housing, the magnets and the mandrel at the time they were potted into position by the potting material 112. The mandrel is supported by the longitudinally aligned apertures in the ends of the housing. After the potting material has set, the mandrel core element 102 is withdrawn from the assembly, as depicted in FIG. 14. The plastic tape 104 remains adhered to the potting material. The polarity alignment of the magnets, as previously described, is dependent on the magnetic or the non-magnetic nature of the fluid transmitting conduit with which the magnetic unit is to be assembled or used.

There are other methods of providing a suitable mandrel. One such method is to substitute a thin tube for the plastic tape 104 depicted in FIG. 12. Such a tube may be of dielectric or of non-dielectric material, depending on the magnetic requirements, as previously described. The tube may also be of metallic or non-metallic material, and in many cases may be a thin paper sleeve.

FIGS. 15 and 16 depict a magnetic unit 114 which is comparable to the magnetic unit 106 depicted in FIGS. 13 and 14 with the single exception that a tubular sleeve 116, shown in partial section, is used in lieu of the wrapped sleeve formed by the plastic tape 104.

When using a sleeve 116, it is not necessary to use a removable mandrel since the sleeve may be potted in position with the ends of the sleeve being positioned by the apertures in the ends of the elongated housing. The inside diameter of the sleeve should be such as will easily receive the conduit which is to pass therethrough. FIG. 16 depicts a fluid transmitting conduit 118 passing through the sleeve 116 in the magnetic unit 108.

It is to be understood that the embodiments of the present invention as shown and described are to be regarded merely as illustrative, and that the invention is susceptible to variations, modifications and changes, without regard to construction methods, within the scope of the appended claims.

We claim:

1. A magnetic unit for polarizing particles in fluid being transmitted through a conduit, said magnetic unit comprising:
   (a) an elongated dielectric rectangular housing having an open side;
   (b) at least two elongated permanent bar magnets potted in spaced apart parallel relationship within said housing; and,
   (c) an open end tube passing through and extending from opposing ends of said rectangular housing and positioned longitudinally between and parallel with said elongated bar magnets, which relationship between said magnets and said tube is permanently potted within said housing thereby preventing movement between said magnets and said tube, the extending ends of said tube comprising means for installation of said magnetic unit in said conduit.

2. A magnetic unit for polarizing particles in fluid being transmitted through a conduit, said magnetic unit comprising:

(a) an elongated dielectric rectangular housing having an open side and longitudinally aligned apertures in opposing ends of said housing;

(b) at least two elongated permanent bar magnets potted in spaced apart relationship within said housing; and, (c) means for receiving said fluid transmitting conduit comprising an elongated sleeve passing through said housing with opposing ends thereof supported by the apertures in said housing and positioned longitudinally between and parallel with said elongated bar magnets, which relationship between said magnets and said sleeve is permanently potted within said housing.

* * * * *